Dec. 6, 1966  J. R. KOBBE  3,290,686
MODULATION CONVERSION CIRCUIT FOR CHANGING FREQUENCY MODULATION
INTO PULSE WIDTH MODULATION AND OMNIRANGE RECEIVER
CIRCUIT UTILIZING SUCH CONVERSION CIRCUIT
Filed May 20, 1963
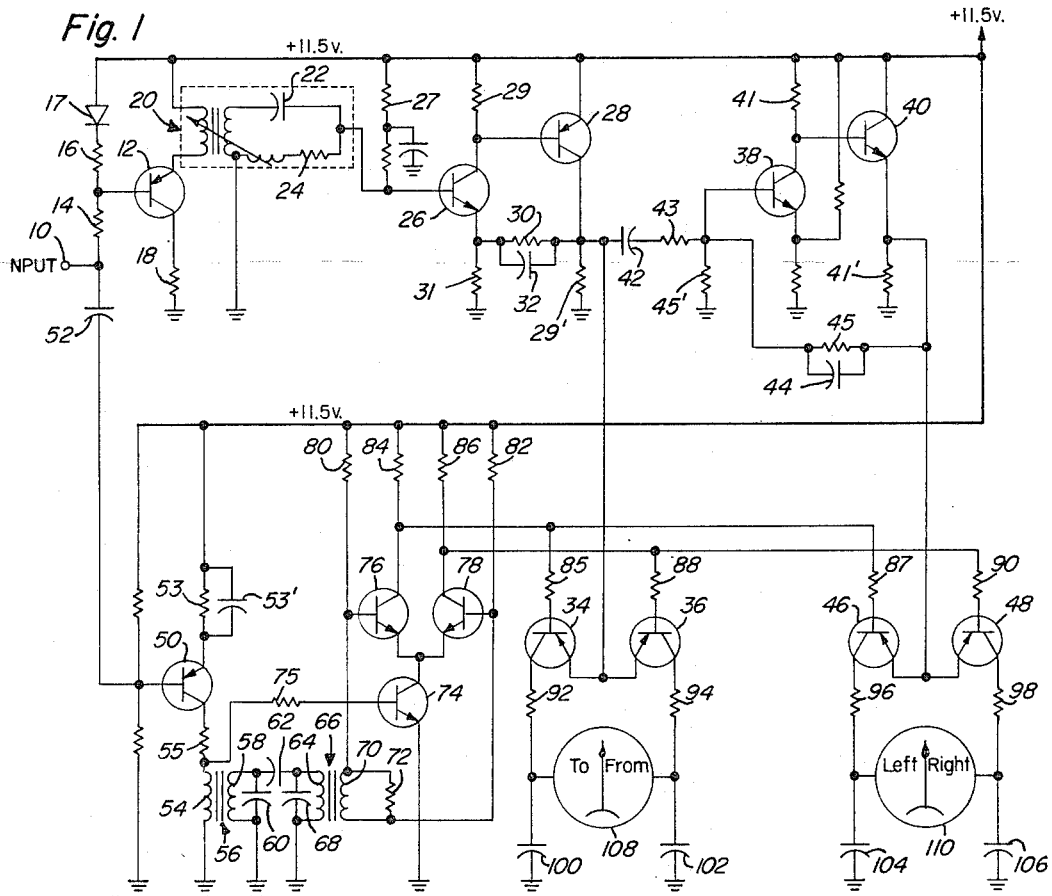
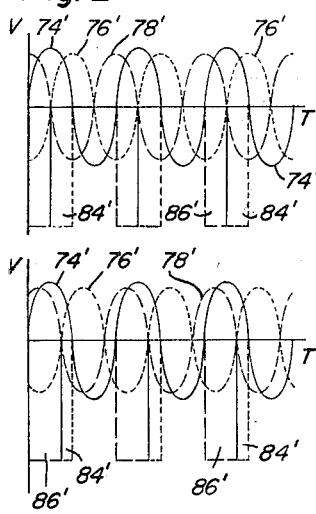
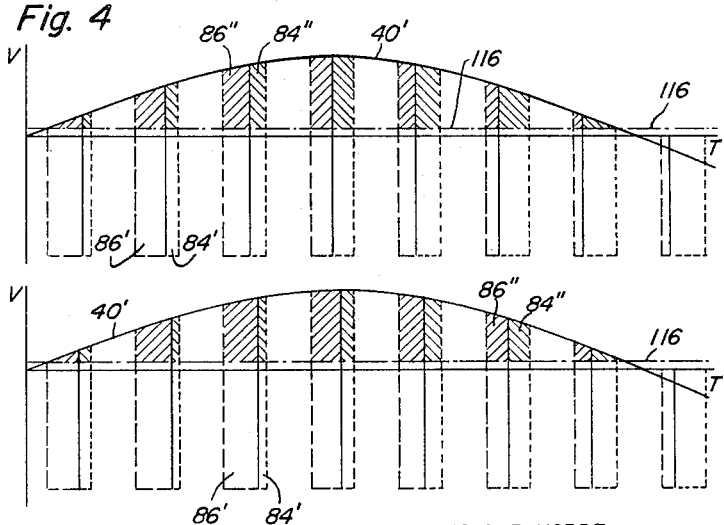
JOHN R. KOBBE
INVENTOR.
BY
BUCKHORN, BLORE, KLARQUIST & SPARKMAN
ATTORNEYS

United States Patent Office 3,290,686
Patented Dec. 6, 1966

3,290,686
MODULATION CONVERSION CIRCUIT FOR CHANGING FREQUENCY MODULATION INTO PULSE WIDTH MODULATION AND OMNIRANGE RECEIVER CIRCUIT UTILIZING SUCH CONVERSION CIRCUIT
John R. Kobbe, 160 SW. Meadow Drive, Beaverton, Oreg.
Filed May 20, 1963, Ser. No. 281,710
12 Claims. (Cl. 343—107)

This invention relates to a modulation circuit for changing frequency modulation into a pulse width modulation and an omnirange receiver circuit utilizing such conversion circuit and more particularly to simplified bearing determining circuits which can be employed in conjunction with a conventional very high frequency airplane receiver to determine the bearing of an aircraft with respect to an omnirange radio transmitting station, and also to obtain a to-from sense indication for determining whether the bearing is to or from the transmitting station.

As is well known an omnirange transmitting station provides a 30 c.p.s. reference signal and a 30 c.p.s. bearing signal. The reference signal is produced by first frequency modulating a 9960 c.p.s. subcarrier at 30 c.p.s. and then employing the frequency modulated subcarrier to amplitude modulate a very high frequency carrier which is transmitted in all directions simultaneously. A directional beam of the very high frequency carrier is also transmitted from another antenna and is rotated at 30 revolutions per second. This provides 30 c.p.s. amplitude modulation of the very high frequency carrier at any given location spaced from the station. The phase angle between the two 30 c.p.s. modulations is made zero along the north bearing from the station. Along any other bearing from the station such phase angle is equal to the angle between such bearing and the north bearing from the station. By determining the phase angle between the two 30 c.p.s. modulations the bearing of an aircraft with respect to the station can be determined. Also the phase relation between the two 30 c.p.s. modulations can be employed to determine whether the bearing is to or from the station.

A conventional very high frequency radio receiver will receive and amplitude demodulate the transmitted very high frequency carrier to derive a 30 c.p.s. bearing signal from the amplitude modulation of the carrier and also derive a reference signal which is the 9960 subcarrier frequency modulated at 30 c.p.s. These bearing and reference signals form the input signals for the bearing determining circuits of the present invention.

Conventional bearing determining circuits usually include elaborate filtering circuits for separating the 30 c.p.s. input bearing signal from the 9960 c.p.s. input reference signal and for eliminating the 9960 c.p.s. signal from the 30 c.p.s. reference signal obtained by demodulating the 9960 frequency modulated subcarrier. Thus it has been considered necessary to obtain substantially pure 30 c.p.s. sine waves from the input bearing signal and the input reference signal for comparison in 30 c.p.s. phase comparison or difference amplifiers. Such phase comparison or difference amplifiers frequently contain iron core transformers suitable for 30 c.p.s. operation.

The phase comparison circuits of the present invention do not require such cores but in order to simplify the bearing determining circuits of the present invention, it is convenient to employ a so-called "resolver" phase shifting circuit including a transformer having an iron core for providing an initial 360° variable phase shift of the 30 c.p.s. input bearing signal. Other types of 360° variable phase shifting circuits can, however, be adapted to the phase determining circuits of the present invention with some added complication. Also in the present invention, simplified 30 c.p.s. phase shifting and amplifying circuits providing negative feedback are employed for subsequent phase shifting of the 30 c.p.s. input bearing signal to produce a pair of 30 c.p.s. output bearing signals shifted 90° in phase with respect to each other and also to eliminate any of the 9960 subcarrier which may pass through the resolver. These two output bearing signals may be referred to as a left-right output bearing signal and a to-from output bearing signal, respectively.

The frequency modulated input reference signal carrier is subjected to modulation conversion in a modulation conversion circuit to produce a pair of output reference signals each made up of pulses at the frequency of the subcarrier, which pulses vary in width, i.e., are pulse width modulated at the 30 c.p.s. frequency. The pulse width modulations of the pulses of the two output reference signals are 180° out of phase with each other at the 30 c.p.s. frequency. Such pulses are all of the same polarity and are still frequency modulated as well as pulse width modulated. The pulses of the two output reference signals are combined directly with each of the output bearing signals, referred to above, in phase comparison or difference amplifier circuits without filtering to convert the output reference signals to 30 c.p.s. A.C. signals. Thus the pulses are employed to gate the output bearing signals on and off repeatedly during half cycles of the output bearing signals to produce combined signals which are then converted to direct current signals by simple filtering circuits. The resulting direct current signals are supplied directly to the terminals of left-right and to-from indicating meters. The modulation conversion and phase comparison circuits all employ transistors operating as switching devices so that very little current flows in such circuits in the absence of signals applied thereto. Also the switching transistors are driven to saturation to provide an effective limiting action. Thus circuits for removing amplitude modulation from the input reference signal prior to modulation conversion in the modulation conversion circuit are rendered unnecessary. The result is that the simplified phase shifting and phase determining and indicating circuits of the present invention can all be incorporated in a lightweight and compact device.

It is therefore an object of the present invention to provide improved bearing determining circuits for an omnirange radio receiver.

Another object of the invention is to provide bearing determining circuits for an omnirange radio receiver in which simplified phase shifting circuits for a low frequency input bearing signal are employed and the resulting output bearing signals are combined with an input reference signal in an improved manner to produce the left-right and to-from indications of an omnirange receiver.

A further object of the invention is to provide an improved modulation conversion circuit for modulation conversion of a frequency modulated subcarrier of an input reference signal to produce a pair of output reference signals containing D.C. pulses at the subcarrier frequency which are pulse width modulated at a low frequency and which are directly combinable with the output bearing signals to obtain left-right and to-from indications.

A still further object of the invention is to provide an improved phase comparison or difference amplifier utilizing output reference signals made up of pulses which are pulse width modulated at a low frequency and also utilizing output bearing signals of the same low frequency to provide D.C. signals directly applicable to the terminals of a left-right and to-from indicating meters.

Other objects and advantages of the invention will appear in the following description of a preferred embodiment of the invention shown in the attached drawing of which:

FIG. 1 is a schematic diagram of a bearing determining circuit in accordance with the present invention;

FIG. 2 is a graph illustrating the action of the modulation conversion circuit of the present invention when a pair of control signals produced in the modulation conversion circuit are 90° out of phase with the subcarrier of the input reference signal;

FIG. 3 is a graph similar to that of FIG. 2 illustrating the action of the modulation conversion circuit when the pair of control signals referred to with respect to FIG. 2 are other than 90° out of phase with the subcarrier of the input reference signal;

FIG. 4 is a graph illustrating the combining of the pulses of a pair of output reference signals with the left-right output bearing signal in the right-left comparison circuit of the present invention when the pulse width modulations of the output reference signals are 90° out of phase with the right-left output bearing signal.

FIG. 5 is a graph similar to that of FIG. 4 illustrating the combining of the pulses of the pair of output reference signals with the left-right output bearing signal when the phase relation referred to with respect to FIG. 4 is other than 90°.

The circuit shown in FIG. 1 includes a pair of separate channels for the bearing signals and the reference signals, the two channels having a common input terminal 10 for the 30 c.p.s. input bearing signal and the 9960 c.p.s. frequency modulated input reference signal. A transistor 12 of the PNP type connected as an emitter follower forms the input stage of the bearing signal channel. The base of transistor 12 is connected to the input terminal 10 through a resistor 14 and to a source of positive D.C. voltage through a resistor 16 in series with a diode 17, which temperature compensates the emitter junction of the transistor. The collector of the transistor is connected to ground through a resistor 18 and the emitter is connected to a source of positive D.C. voltage through the primary winding of a 30 c.p.s. resolver transformer 20. The resolver transformer has two secondary windings which contain the same number of turns and are positioned at right angles to each other. The primary and secondary windings are on separate core members, one of which is a rotor and the other a stator.

The two secondary windings of the resolver transformer each have one end connected to ground and a capacitor 22 is connected between the other end of one of such windings and an output terminal for the resolver circuit. A resistor 24 is connected between the other end of the other secondary winding and such output terminal. By employing a capacitor 22 having a value of capacitive reactance at 30 c.p.s. equal in value to the resistance of resistor 24, the 30 c.p.s. voltage between ground and the output terminal of the resolver circuit remains proportional in amplitude to the 30 c.p.s. voltage supplied to the primary winding of the resolver transformer and is shifted in phase through an angle equal to the angle of rotation of the rotor of the resolver transformer from a zero phase angle position of the rotor. The resolver transformer is provided with a dial having 360° graduations employed to indicate the angular position of the rotor to thereby indicate a selected bearing with respect to the transmitting station.

The output terminal of the resolver is connected to the base of a transistor 26 of the NPN type connected as a common emitter amplifier. The base of the transistor 26 is also connected to a source of positive D.C. voltage through a voltage dropping and decoupling circuit 27. The transistor has its collector connected to the base of another transistor 28 of the PNP type and to a source of positive D.C. voltage through a load resistor 29. The transistor 28 is also connected as a common emitter amplifier having a load resistor 29' connected between its collector and ground. A negative feedback path is provided between the collector of the transistor 28 and the emitter of the transistor 26 by a resistor 30 and a capacitor 32 in parallel in conjunction with a resistor 31 connected between the emitter of the transistor 26 and ground. The impedance of such feedback path is much less at the 9960 c.p.s. frequency of the subcarrier of the input reference signal than at the 30 c.p.s. of the bearing signal and the result is that any of the subcarrier signal which passes through the resolver is largely eliminated. The 30 c.p.s. bearing signal from the resolver is amplified by the transistors 26 and 28 and is somewhat shifted in phase as a result of the capacitive reactance in the negative feedback path discussed above. The amplified 30 c.p.s. signal from the collector of the transistor 28 is supplied to the collectors of a pair of transistors 34 and 36 forming part of a to-from indicating circuit described more fully below.

The output from the collector of the transistor 28 is also supplied to the base of another transistor 38 of the NPN type connected as a common emitter amplifier and having its collector connected to the base of a further transistor 40 of the NPN type and to a source of positive D.C. voltage through a load resistor 41. The connection between the collector of the transistor 28 and the base of the transistor 38 is through a D.C. blocking capacitor 42 and a resistor 43 in series. The transistor 40 is connected as an emitter follower having its emitter connected to ground through a resistor 41' and a negative feedback path is provided between the emitter of the transistor 40 and the base of the transistor 38 through a capacitor 44 and a resistor 45 connected in parallel in conjunction with a resistor 45' connected between the base of the transistor 38 and ground. The blocking capacitor has a low capacitive reactance relative to the resistance of the resistor 43 at 30 c.p.s. and the capacitor 44 in the feedback path also has a capacitive reactance which is low relative to the resistance of the resistor 45. The two transistors 38 and 40 and their associated circuit thus form an operational amplifier of the voltage integrator type so that the 30 c.p.s. signal voltage from the collector of the transistor 38 is amplified and shifted in phase through very nearly 90° to provide an output left-right bearing signal which is supplied to the emitter of a pair of transistors 46 and 48 forming part of a left-right indicating circuit, also described more fully below.

The second channel of the bearing determining circuits of FIG. 1 includes a transistor 50 of the PNP type which functions primarily as a common emitter amplifier for the 9960 c.p.s. frequency modulated subcarrier forming the input reference signal. The transistor 50 may have some limiting action at high input signal levels but effective limiting is provided in subsequent circuits. The 9960 c.p.s. subcarrier is supplied to the base of the transistor 50 from the common input terminal 10 through a capacitor 52 which has a relatively high impedance to the 30 c.p.s. input signal. The emitter of such transistor is connected to a source of positive D.C. voltage through a resistor 53 by-passed by a capacitor 53' which has a relatively low impedance at the subcarrier frequency.

The output from the collector of the transistor 50 is supplied to the primary winding 54 of a transformer 56 through a resistor 55. The transformer 56 forms part of a modulation converter circuit and has its secondary winding 58 connected in parallel with a capacitor 60 to provide a parallel tuned circuit substantially resonant at the 9960 c.p.s. central frequency of the subcarrier. One terminal of such circuit is connected to ground and the other terminal is connected through a capacitor 62 to one terminal of a second similar tuned circuit including a primary winding 64 of another transformer 66 and a capacitor 68 connected across the winding 64. The tuned circuit including the winding 64 is also substantially resonant at the central frequency of the subcarrier and has its other terminal connected to ground. The secondary winding 70 of the transformer 68 has a resistor 72 connected across its terminals. By coupling the two tuned circuits of transformers 56 and 60 with a capacitor 62 of low value, i.e. having high capacitive reactance at 9960 c.p.s., the output voltage across the secondary winding can be made 90° out of phase with the voltage across the primary winding 54 at the 9960 c.p.s. center frequency of the frequency modulated subcarrier. Thus two control signals which are of the same frequency as and in quadrature phase relation with the input reference signal but which are 180° out of phase with each other can be obtained from the secondary winding 70.

The 9960 c.p.s. subcarrier voltage across the primary winding 54 of the transformer 56 is applied between ground and the base of a transistor 74 of the NPN type through a resistor 75. The transistor 74 has its emitter connected to ground and is normally cut off in the absence of a signal applied to its base. That is to say, the primary winding 54 has low resistance so that the base of the transistor 74 is substantially at ground potential even if direct current flows through the winding 54. This transistor is turned on so as to be conductive between its collector and emitter only during the positive half cycles of the frequency modulated subcarrier. A pair of similar transistors 76 and 78 of the NPN type have their emitters connected to the collector of the transistor 74 and their bases connected to the opposite ends of the secondary winding 70 of the transformer 66. The transistors 76 and 78 have their bases connected to a source of positive D.C. voltage through resistors 80 and 82, respectively, and their collectors connected to such source through resistors 84 and 86, respectively. The transistors 76 and 78 are normally conducting in the absence of a signal applied to their bases but no current flows through these transistors as long as transistor 74 is cut off. Negative voltages during negative half cycles of the signals from the secondary winding 70 alternately cut off the transistors 76 and 78 and the result is that the pair of transistors 76 and 74 is rendered conducting only during the time that positive voltages are simultaneously applied to the bases of both of these transistors from the transformer windings 70 and 54, respectively. The same is true of the pair of transistors 78 and 74.

If the primary winding of the transformer 56 were supplied with a constant frequency signal having the subcarrier central frequency of 9960 c.p.s., the pairs of transistors 76–74 and 78–74 would be rendered conducting by equal amounts during alternate half cycles of such signal. This is illustrated in FIG. 2 in which the voltage applied to the base of the transistor 74 is indicated by the curve 74'. The voltage applied to the base of the transistor 76 is indicated by the curve 76' and the voltage applied to the base of the transistor 78 is indicated by the curve 78'. Since the voltage 74' applied to the base of transistor 74 is 90° out of phase with the control voltages 76' and 78' applied to the bases of the transistors 76 and 78 and conduction through the pairs of transistors referred to occurs during positive half cycles of both voltages only, the two pairs will conduct alternately through approximately one-half of each of such alternate half cycles. This means that narrow negative voltage pulses 84' and 86' at a frequency of 9960 c.p.s. will appear alternately at the collectors of the transistors 76 and 78. It further means that such pulses will all be of the same width in the absence of frequency modulation of the subcarrier.

Since the 9960 c.p.s. subcarrier is frequently modulated at 30 c.p.s., the two control voltages applied to the bases of the transistors 76 and 78 are shifted in phase at the 30 c.p.s. reference frequency as a result of the tuned circuits of the transformers 56 and 66 becoming alternately capacitive and inductive as the frequency of the subcarrier varies past its central frequency. One possible phase relation of the two control signals 76' and 78' other than 90° with respect to the signal 74' applied to the base of the transistor 74 is illustrated in FIG. 3. With the phase relation illustrated in such figure, the negative pulses 86' are much wider than the pulses 84'. For phase relations on the other side of the 90° relation the negative pulses 84' will be wider than the pulses 86'. This means that the negative pulses appearing across the load resistors will vary in width at the 30 c.p.s. frequency so that the pulses of the two resulting output reference signals will be equally pulse width modulated while still being frequency modulated. It also means that the pulse width modulations of the negative pulses of the two output reference signals will be 180° out of phase with each other.

The two pairs of transistors 76–74 and 78–74 are driven to saturation or are substantially fully turned on during the production of the negative pulses 84' and 86' so that such pulses are essentially squarewave pulses all having the same amplitude irrespective of the amplitude of the input reference signal. This provides the amplitude modulation limiting action referred to above.

The pulse width modulated negative pulses 84' of the output reference signal from the collector of the transistor 76 are applied to the bases of the transistors 34 and 46 of the to-from and left-right indicating circuits, respectively, through resistors 85 and 87, respectively, and the similar pulses 86' of the output reference signal from the collector of the transistor 78 are applied to the bases of the transistors 36 and 48 of such indicating circuits through resistors 88 and 90, respectively. Filter resistors 92, 94, 96 and 98 each have one end connected to the collectors of the transistors 34, 36, 46 and 48, respectively, and filter capacitors 100, 102, 104 and 106, respectively, are connected between the other ends of such filter resistors and ground. A to-from indicating D.C. meter 108 is connected between the terminals of the capacitors 104 and 106 which are remote from ground and a left-right indicating D.C. meter 110 is connected between the similar terminals of the capacitors 100 and 102.

At times between the negative pulses 84' and 86' appearing thereon, the emitters of the transistors 76 and 78 and therefore the bases of transistors 34, 36, 46 and 48 are substantially at the positive D.C. voltage of the source to which they are connected, since the transistors 76 and 78 are nonconducting. Under these conditions the emitters of the transistors 34, 36, 46 and 48 are less positive than the bases of such transistors even when positive half cycles of an output bearing signal are supplied to such emitters from the bearing signal channel of the present invention. Also the collectors of such transistors will assume a positive voltage during operation of the circuit, as discussed below, but at times between such negative pulses such collectors are less positive than the bases of such transistors. This is of importance since, as also discussed below, current conduction through the transistors 34, 36, 46 and 48 can be in either direction, i.e. either from emitter to collector or from collector to emitter. However either type of conduction can only occur when a negative pulse 84' or 86' is applied to the base of the respective transistor.

The negative pulses 84' of the output reference signal applied to the base of transistor 46 will be of the greatest width when the pulses 86' of the output reference signal applied to the base of the transistor 48 are the narrowest, and vice versa, because of the 180° phase relation between the pulse width modulations of such output reference signals. When the positive half cycles of the output bearing signal applied to the emitters of the transistors 46 and 48 occurs half way between the times of maximum pulse width of the two output reference signals, i.e. when the output bearing signal is 90° out of phase with the pulse width modulation of the output reference signals, the transistors 46 and 48 are rendered conducting in a manner which causes the capacitors 104 and 106 to be charged to the same voltage. The reason for this is illustrated in FIG. 4 in which the curve 40' represents a positive half cycle of the 30 c.p.s. output bearing signal from the transistor 40 which is applied to the bases of the transistors 46 and 48. The transistor 46 is conducting during the time indicated by the widths of the shaded areas 84″. These shaded areas have the same widths as corresponding pulses 84′, which are shown as being pulse width modulated at 30 c.p.s. The transistor 48 is conducting during the time indicated by the widths of the shaded areas 86″ of the same width as the pulses 86′ also shown as being pulse width modulated. The heights of the shaded areas 84″, i.e. the voltage of the half cycle 40′ in excess of a turn on voltage shown by the line 116, represents the instantaneous values of the voltage of the positive half cycle 40′ of the output bearing signal during the time the transistors 46 and 48, respectively, are conducting.

Current flow through each of the transistors 46 or 48 can be from the emitter to the collector when the instantaneous voltage of the positive half cycle 40′ exceeds the voltage across a capacitor 104 or 106, respectively, and conversely current flow through such transistors can be from collector to emitter when the voltage across a capacitor 104 or 106, respectively, exceeds the instantaneous voltage of the half cycle 40′. Such current flow occurs only during the presence of a negative pulse 84′ or 86′ on the base of a transistor 46 or 48, respectively. The capacitor 104 will charge through the resistor 96 during the times indicated by the widths of the shaded areas 84″ near the center of the positive half cycle 40′ and will discharge through such resistor during the times indicated by the widths of the shaded areas 84″ near the ends of the positive half cycle. Similarly the capacitor 106 will charge through the resistor 38 during the times indicated by the widths of the shaded areas 86″ near the center of the half cycle 40′ and will discharge during the times indicated by the widths of the shaded areas 86″ near the ends of the half cycle. Since there is a shaded area 86″ in FIG. 4 similar in height and width to each shaded area 84″ and in a corresponding position in the half cycle 40′, both capacitors 104 and 106 will charge to the same voltage and a null indication will be given by the meter 110.

When the left-right output bearing signal is shifted in phase to other than 90° with the pulse width modulations of the output reference signals, a condition such as illustrated in FIG. 5 results, the capacitor 104 charges during shorter times as indicated by the narrow shaded areas 84″ near the center of the half cycle 40′ and discharges during longer times as indicated by the wider shaded areas 84″ near the ends of the half cycle. Conversely the capacitor 106 charges during longer times as indicated by the wide shaded areas 86″ near the center of the half cycle 40′ and discharges during shorter times as indicated by the narrower shaded areas 86″ near the ends of the half cycle 40′. The capacitor 106 thus charges to a higher average voltage than capacitor 104 and an indication is produced on the meter 110. The effect of the transistors turning off and on is thus the same as if the resistor 96 because larger during charging of capacitor 104 and smaller during discharging of such capacitor and the resistor 98 became smaller during charging of the capacitor 106 and larger during discharging of such capacitor so that the capacitor 106 charges to the higher voltage. If the phase of the left-right output bearing signal were shifted in the opposite direction from that illustrated in FIG. 5, capacitor 104 would then charge to the higher voltage.

The voltages to which the two capacitors 104 and 106 charge are substantially proportional to the respective sums of the shaded areas 84″ and 86″ under a positive half cycle 40′ of the left-right output bearing signal divided by the total time required for such half cycle. Since such total time is the same in both cases, the voltages to which the capacitors 104 and 106 charge are substantially proportional to the sum of such shaded areas 84″ and the sum of such shaded areas 86″, respectively.

It will be apparent that approximately 5000 pulses 84′ and approximately 5000 pulses 86′ will occur during a positive half cycle 116 instead of the few shown in FIGS. 4 and 5. It will also be apparent that the turn on voltage line 116 may be at the zero axis of the left-right bearing signal, of which a positive half cycle 40′ only is shown in FIGS. 4 and 5, or even below such zero axis, and that such zero axis is actually at a positive voltage set by current flow through the resistor 41′. It should also be noted that the areas of the shaded areas 84″ and 86″ discussed above are independent of the amplitude of the pulses 84′ and 86′ so as to provide a further amplitude modulation limiting action.

The circuits containing the resistors 96 and 98 and capacitors 104 and 106 are in fact time constant or filter circuits which eliminate both the negative pulses 84′ and 86′ of the output reference signals and the positive half cycles 40′ of the output bearing signal to provide D.C. signals for operation of the meter 110. Whenever the output bearing signal is 90° out of phase with the pulse width modulations of the output reference signals, the meter 110 produces a null reading indicating that the airplane is on the bearing selected by the resolver 20 and indicated on the resolver dial. A further relative phase shift between these two signals in one direction will produce a left reading on the meter and such a phase shift in the other direction will produce a right reading indicating that the airplane is to the left or right of the selected bearing. With this indication only, however, there is a 180° ambiguity as the whether the selected bearing is to or from the omnirange transmitter and thus is resolved by the to-from indicating circuit.

The to-from indicating circuit including the transistors 34 and 36 operates in a manner similar to the left-right indicating circuit just discussed. The only difference is that when the airplane is on or close to the bearing selected by the resolver 20, the to-from output bearing signal is very close to being either in phase with or 180° out of phase with the pulse width modulations of the output reference signals. Under these conditions one of the capacitors 100 or 102 will charge to a very much higher voltage than the other by the same action explained with reference to FIGS. 4 and 5. Thus if the to-from output bearing signal is in phase with the pulse width modulation of the output reference signal applied to the base of the transistor 34 and 180° out of phase with the pulse width modulations of the output reference signal applied to the base of the transistor 36, the capacitor 100 charges to a higher voltage than the capacitor 102 to provide a to-from indication on the meter which will resolve the ambiguity referred to.

The phase determining circuits providing for selecting a desired bearing with respect to an omnirange radio transmitting station provide the same information as previous circuits, but such information is obtained reliably and accurately with simplified circuitry requiring fewer components and a minimum of space. The dial indication on the resolver is set so as to read zero bearing when the plane containing the receiver is at a position spaced from an omnirange transmitting station being received and is on a north bearing from such station, so that the left-right indication of the meter 110 is zero or null and the indication of the meter 108 is from the station. At any other location spaced from the station the resolver rotor is turned until a null reading is obtained on the meter 110. The dial of the resolver then indicates the bearing which may be to or from the station and the meter 108 indicates whether the thus selected bearing is actually to or from the station. The left-right indication can be employed to fly the plane on a course along the bearing thus selected toward or away from the station.

It is to be noted that the two output reference signals from the collectors of the transistors 76 and 78 of the modulation conversion circuit of the present invention can be converted to a push-pull audio output signal at the frequency modulation frequency by simple conventional filtering or by-pass circuits to remove the frequency modulated carried component of the output signal so as to provide discriminator operation. Also either of the resulting audio outputs will provide a single ended output. The modulation conversion circuit shown provides an amplified output and is particularly suitable for use in the phase determining circuits of the present invention but is not limited to use with the frequencies discussed in this application and has general application. Even as applied to the present invention the output of the modulation conversion circuit may be pulse width modulated positive pulses instead of negative pulses if PNP transistors are substituted for NPN transistors, at least in the modulation conversion and associated circuits including the comparator or difference amplifier circuits. Also the signals supplied to the to-from and left-right indicator circuits may even be single ended instead of push-pull, for example in the case of the left-right indicating circuit, by eliminating one of the transistors 46 or 48 and connecting the corresponding terminal of the meter 110 to an average reference voltage. It should also be noted that the transistor 74 may be eliminated from the modulation converter circuit by connecting the upper terminal of the transformer primary winding 54 directly to the emitters of the transistors 76 and 78, particularly if the output impedances including the resistors 82 and 84 have high values so as to not unduly load the circuit. The circuit shown is, however, the preferred circuit. In any event, the modulation converter circuit of the present invention even when used as part of a discriminator circuit for demodulating a frequency modulated carrier does not require prior amplitude modulation limiting circuits. Also it is apparent that the transistors 34, 36, 46 and 48 as well as the pairs of transistors 76–74 and 78–74 operate as gates to permit current flow through these transistors only when a signal is present, the pulses of the output reference signals from the pairs of transistors 76–74 and 78–74 being applied to the transistors 34, 36, 46 and 48 to gate the lower frequency left-right and to-from output bearing signals.

It will be apparent that various changes in the details of the embodiment shown may be made without departing from the spirit of the invention.

I claim:
1. Bearing determining circuits for an omnirange radio receiver, comprising:
   phase shifting means to vary the phase of a low frequency input bearing signal to select a bearing with respect to an omnirange transmitter and obtain an output bearing signal,
   means for converting a higher frequency input reference signal which is frequency modulated with a low frequency reference signal having the same frequency as the input bearing signal into an output reference signal containing pulses at said higher frequency which are pulse width modulated at said low frequency, and
   means for combining said pulses of said output reference signal with said output bearing signal to obtain a pair of indicator signals having relative values depending upon the differences in phase between said output bearing signal and the pulse width modulations of said output reference signals.

2. Bearing determining circuits utilizing signals from an omnirange receiver including a low frequency bearing signal and a higher frequency reference signal frequency modulated with a low frequency reference signal having the same frequency as the input bearing signal, said circuits comprising:
   phase shifting means for providing an output bearing signal including a variable phase shifter for the input bearing signal and amplifying and fixed phase shifter means following said variable phase shifter and having negative feedback more effective at said high frequency than at said low frequency to substantially eliminate from said output bearing signal any of said higher frequency reference signal passing through said variable phase shifter,
   modulation converter means for converting a higher frequency input reference signal which is frequency modulated with a low frequency reference signal having the same frequency as the input bearing signal into a pair of output reference signals containing pulses at said higher frequency which are pulse width modulated at said low frequency with the pulse width modulations thereof out of phase with each other, and
   gating means employing said pulses of said pair of output reference signals to gate said output bearing signal to obtain a pair of indicator signals having relative values depending upon the differences in phase between said output bearing signal and the pulse width modulations of said output reference signals.

3. Bearing determining circuits for an omnirange radio receiver, comprising:
   phase shifting means to vary the phase of a low frequency input bearing signal to select a bearing with respect to an omnirange transmitter and obtain an output bearing signal,
   modulation conversion means for converting a higher frequency input reference signal which is frequency modulated with a low frequency reference signal having the same frequency as the input bearing signal into an output reference signal containing pulses at said higher frequency which are pulse width modulated at said low frequency with the pulse width modulations thereof out of phase with each other,
   means for combining said pulses of said output reference signal with said output bearing signal to obtain an indicator signal having a value depending upon the differences in phase between said output bearing signal and the pulse width modulations of said output reference signal, and
   indicating means responsive to said indicator signal for providing information as to the location of said receiver relative to the selected bearing.

4. Bearing determining circuits for an omnirange radio receiver, comprising:
   phase shifting means to vary the phase of a low frequency input bearing signal to select a bearing with respect to an omnirange transmitter and obtain an output bearing signal,
   modulation conversion means for converting a higher frequency input reference signal which is frequency modulated with a low frequency reference signal having the same frequency as the input bearing signal into a pair of output reference signals containing pulses at said higher frequency which are pulse width modulated at said low frequency with the pulse width modulations thereof out of phase with each other,
   means having a pair of meter terminals for combining said pulses of said pair of output reference signals with said output bearing signal to obtain at said terminals respectively a pair of direct current indicator signals having relative values depending upon the differences in phase between said output bearing signal and the pulse width modulations of said output reference signals, and
   a direct current meter connected between said terminals for indicating which of said indicator signals is the greater to thereby provide information as to the location of said receiver relative to the selected bearing.

5. Bearing determining circuits for an omnirange radio receiver, comprising:
   phase shifting means to vary the phase of a low frequency input bearing signal to select a bearing with respect to an omnirange transmitter and obtain a left-right output bearing signal and a to-from output bearing signal phase shifted approximately 90° with respect to the left-right output bearing signal, modulation conversion means for converting a higher frequency input reference signal which is frequency modulated with a low frequency reference signal having the same frequency as the input bearing signal into a pair of output reference signals containing pulses at said higher frequency which are pulse width modulated at said low frequency with the pulse width modulations thereof out of phase with each other, means for combining said pulses of said pair of output reference signals with said output bearing signals to obtain a pair of left-right indicator signals having relative values depending upon the differences in phase between said left-right output bearing signal and the pulse width modulations of said output reference signals and a pair of to-from indicator signals having relative values depending upon the difference in phase between said to-from output bearing signal and the pulse width modulations of said output reference signals, indicating means responsive to said left-right indicator signals for indicating whether said receiver is located to the left or right of the selected bearing, and indicating means responsive to said to-from indicator signals for indicating whether the select bearing is to or from the transmitter.

6. Bearing determining circuits for an omnirange radio receiver, comprising:

phase shifting means to vary the phase of a low frequency input bearing signal to select a bearing with respect to an omnirange transmitter and obtain an output bearing signal, modulation conversion means including transformer means connected to be supplied with a higher frequency input reference signal which is frequency modulated with a low frequency reference signal having the same frequency as said input bearing signal and providing oppositely phased control signals in quadrature with said input reference signal at the central frequency of said input reference signal and having relative phase shifts between said control signals and said input reference signal in opposite directions during alternate half cycles of the frequency modulation of said input reference signal, said modulation conversion means including a first amplifying means connected to be rendered capable of conducting by said input reference signal during alternate half cycles only thereof, said modulation conversion means also including a pair of second amplifying means each connected in series with said first amplifying means and connected to be each rendered capable of conducting by one of said control signals respectively during alternate half cycles only thereof to thereby provide a pair of output reference signals containing said low frequency reference signal.

7. Bearing determining circuits in accordance with claim 6 in which said amplifying means are transistors with the emitter-collector circuit of each of said second amplifying means connected in series with the emitter-collector circuit of said first amplifier means and with the base of said first amplifying means connected to have said input reference signal supplied thereto and the bases of said second amplifying device connected to have said control signals respectively supplied thereto.

8. Bearing determining circuits for an omnirange radio receiver, comprising:

phase shifting means to vary the phase of a low frequency input bearing signal to select a bearing with respect to an omnirange transmitter and obtain an output bearing signal, modulation conversion means including a first transformer having a primary winding connected to be supplied with a higher frequency input reference signal which is frequency modulated with a low frequency reference signal having the same frequency as said input bearing signal and a secondary winding having a capacitor connected thereacross to provide a secondary circuit resonant at the central frequency of said input reference signal, said modulation conversion means also including a second transformer having a primary winding with a capacitor connected thereacross to provide a primary circuit resonant at said central frequency and having a secondary winding, said modulation conversion means also including a capacitor coupling said resonant circuits and having a value producing a control signal at an end terminal of said secondary winding which is in quadrature phase relation with respect to said input reference signal at said central frequency and which varies in phase in opposite directions from said quadrature phase relation during alternate half cycles of the frequency modulation of said input reference signal, said modulation conversion means also including means responsive to said input reference signal and said control signal for producing an output signal containing pulses at the frequency of said input reference signal and which are pulse width modulated at said low frequency.

9. Modulation conversion means comprising:

transformer means connected to be supplied with an input signal which is frequency modulated with a lower frequency signal and providing a control signal in quadrature with said input signal at the central frequency of said input signal and having relative phase shifts between said control signal and said input reference signal in opposite directions during alternate half cycles of the frequency modulation of said input signal, first and second amplifying means connected in series with each other to provide an output signal only when both of said amplifying devices are conducting, said first amplifying means being connected to be rendered capable of conducting by said input signal during alternate half cycles only of said input signal, and said second amplifying means being connected to be rendered capable of conducting by said control signal during alternate half cycles only of said control signal to thereby provide an output signal containing pulses at the frequency of said input signal and which are pulse width modulated at the frequency of said lower frequency signal.

10. Modulation conversion means in accordance with claim 9 in which said amplifying means are transistors with the emitter-collector circuit of said second amplifying means connected in series with the emitter-collector circuit of said first amplifier means and with the base of said first amplifying means connected to have said input signal supplied thereto and the base of said second amplifying means connected to have said control signal supplied thereto.

11. Modulation conversion means comprising:

transformer means connected to be supplied with an input signal which is frequency modulated with a lower frequency signal and providing oppositely phased control signals in quadrature with said input signal at the central frequency of said input signal and having relative phase shifts between said control signals and said input reference signal in opposite directions during alternate half cycles of the frequency modulation of said input signal, first amplifying means and a pair of second amplifying means each connected in series with said first amplifying means to provide one output signal when said first amplifying means and one of said second amplifying means are both conducting and to provide another output signal when said first amplifying means and the other of said second amplifying means are both conducting, said first amplifying means connected to be rendered capable of conducting by said input signal during alternate half cycles only of said input signal, said pair of second amplifying means each being connected to be rendered capable of conducting by one of said control signals respectively during alternate half cycles only of the respective control signals to thereby provide a pair of output signals each containing pulses at the frequency of said input signal and which are pulse width modulated at the frequency of said lower frequency signal.

12. Modulation conversion means comprising:

a first transformer having a primary winding connected to be supplied with an input signal frequency modulated with a lower frequency signal and a secondary winding having a capacitor connected thereacross to provide a secondary circuit resonant at the central frequency of said input signal, said modulation conversion means also including a second transformer having a primary winding with a capacitor connected thereacross to provide a primary circuit resonant at said central frequency and having a setcondary winding, said modulation conversion means also including a capacitor coupling said resonant circuits having a value producing oppositely phased control signals at the end terminals of said secondary winding which are in quadrature phase relation with respect to said input signal at said central frequency and which vary in phase in opposite directions from said quadrature phase relation during alternate half cycles of the frequency modulation of said input signal, said modulation conversion means also including means responsive to said input signal and said control signals for producing a pair of output signals containing pulses at the frequency of said input signal and which are pulse width modulated at said lower frequency with the pulse width modulations thereof 180° out of phase.

References Cited by the Examiner

UNITED STATES PATENTS

| | | | |
|---|---|---|---|
| 2,686,304 | 8/1954 | Ruben et al. | 343—102 |
| 2,924,821 | 2/1960 | Dodington et al. | 343—106 |
| 3,004,227 | 10/1961 | Plouffe et al. | 332—1 |
| 3,187,273 | 6/1965 | Chasek | 332—1 |
| 3,202,994 | 8/1965 | Fombonne | 343—102 X |

CHESTER L. JUSTUS, *Primary Examiner.*

H. C. WAMSLEY, *Assistant Examiner.*